(12) United States Patent
Smith et al.

(10) Patent No.: US 6,374,179 B1
(45) Date of Patent: Apr. 16, 2002

(54) METHOD AND SYSTEM FOR DISTRIBUTING POSITION INFORMATION

(75) Inventors: Merlin Smith, Chandler; Mark Clayton, Phoenix; Patrick A. Stadler, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/637,724

(22) Filed: Aug. 11, 2000

(51) Int. Cl.$^7$ ................................................ G01C 21/00
(52) U.S. Cl. ..................... 701/207; 701/213; 342/357.1; 342/357.14; 455/457
(58) Field of Search ................................. 701/207, 213, 701/214, 215, 216; 342/357.06, 357.1, 357.09, 357.13, 357.14; 340/991, 992, 993, 988, 989; 455/456, 457

(56) References Cited

U.S. PATENT DOCUMENTS

| | | | |
|---|---|---|---|
| 5,025,261 A | | 6/1991 | Ohta et al. .................... 340/995 |
| 5,311,173 A | | 5/1994 | Komura et al. ......... 342/357.09 |
| 5,842,131 A | * | 11/1998 | Yamane ....................... 455/456 |
| 5,872,539 A | * | 2/1999 | Mullen ........................ 342/357 |
| 6,038,559 A | | 3/2000 | Ashby et al. .................... 707/4 |
| 6,075,987 A | * | 6/2000 | Camp, Jr. et al. ............ 455/427 |
| 6,097,337 A | * | 8/2000 | Bisio ...................... 342/357.14 |
| 6,144,336 A | * | 11/2000 | Preston et al. ......... 342/357.09 |
| 6,185,427 B1 | * | 2/2001 | Krasner et al. ............. 455/456 |
| 6,201,497 B1 | * | 3/2001 | Snyder et al. ......... 342/357.06 |
| 6,204,808 B1 | * | 3/2001 | Bloebaum et al. ..... 342/357.07 |
| 6,222,483 B1 | * | 4/2001 | Twitchell et al. ...... 342/357.09 |
| 6,239,742 B1 | * | 5/2001 | Krasner ................. 342/357.02 |

\* cited by examiner

*Primary Examiner*—Tan Nguyen
(74) *Attorney, Agent, or Firm*—Kevin D. Wills

(57) ABSTRACT

An embodiment of the invention includes a plurality of navigational position sources (208) disposed to provide position data, a position service module (202) to form a composite of position data (240) and a position session module (204) to transmit composite of position data (240) to applications (210, 212, 214, 216). An embodiment of a method includes providing a plurality of navigational position sources (208) disposed to provide position data, providing a position service module (202) disposed to receive position data, and form composite of position data (240). Composite of position data (240) is then transmitted to one or more applications (210, 212, 214, 216) via a position session module (204).

25 Claims, 5 Drawing Sheets

METHOD AND SYSTEM FOR DISTRIBUTING POSITION INFORMATION

RELATED APPLICATIONS

Related subject matter is disclosed in U.S. patent application entitled "Information Appliance System having A Navigational Position Generator and Method" having application Ser. No. 09/637,453 and filed on the same date herewith.

FIELD OF THE INVENTION

This invention relates generally to an information appliance system and, in particular to a method and system for distributing position information.

BACKGROUND OF THE INVENTION

Navigational position devices are currently used in numerous devices to provide positional data for a variety of purposes. For example, global positioning systems (GPS) are currently used in land, sea and air vehicles to provide an accurate three-dimensional location anywhere in the world. Applications also use positional data for things such as location specific weather and navigational aids in automobiles.

Presently, positional data from numerous navigational position devices can be accessed by a device or application, whereby the device or application communicates directly with the source of positional data. This requires substantial resources, for example processing power and memory, in order for navigational position devices to communicate with each position device directly and simultaneously. Also, an application may receive positional data that lacks sufficient resolution or is too detailed for the application's purpose. This creates further inefficiencies by having to process information that may not be useful.

Accordingly, there is a significant need for a method and system for overcoming deficiencies in the prior art as outlined above.

BRIEF DESCRIPTION OF THE DRAWINGS

Referring to the drawing.

Figure 1:
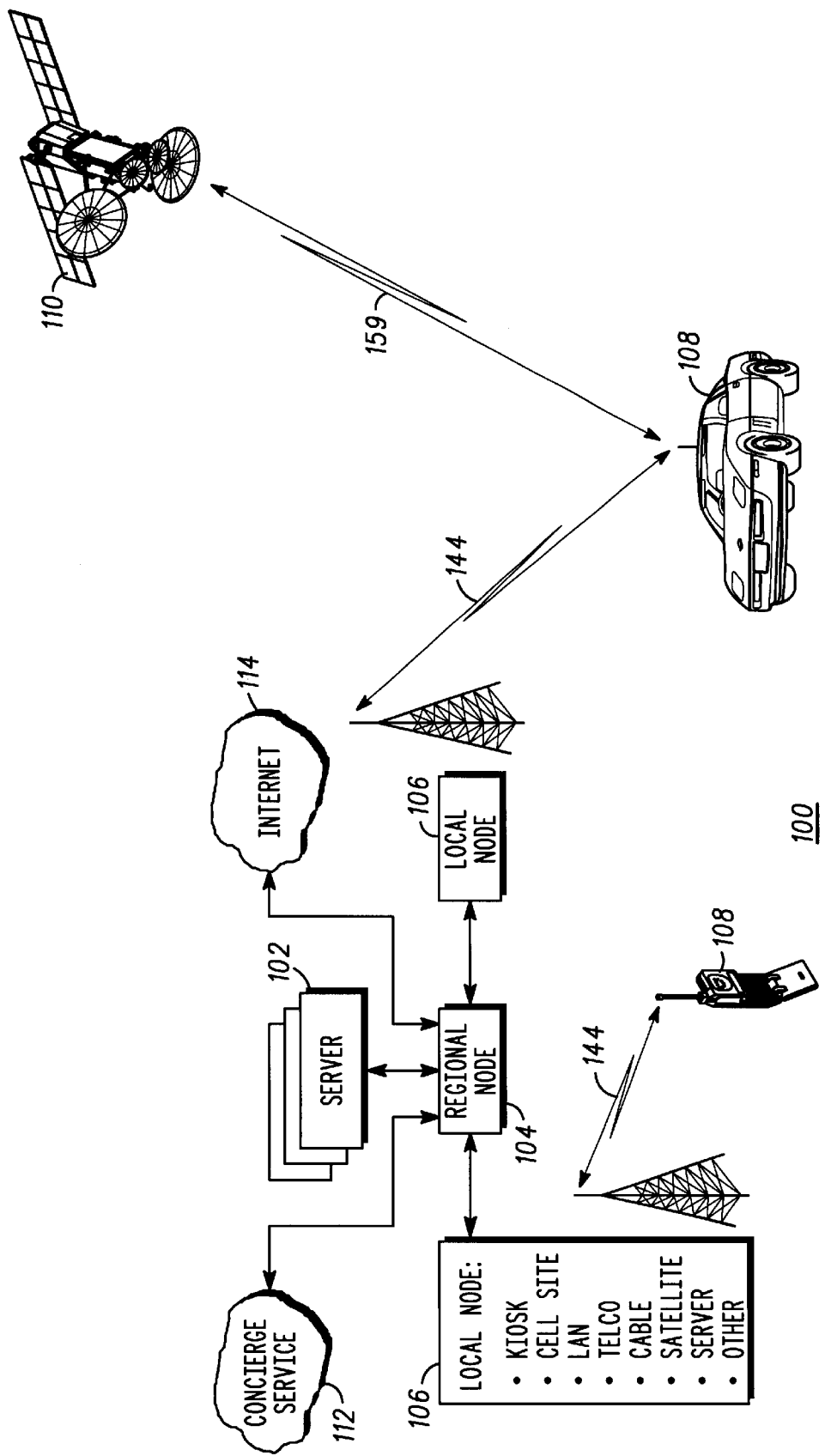
FIG. 1 depicts an exemplary information appliance system.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

An embodiment of the invention is for an information appliance system having a plurality of navigational position sources providing position data coupled with a position service module to form the position data into a composite of position data. A position session module is disposed to receive the composite of position data and transmit to one or more applications.

An exemplary method of an embodiment of the invention includes a position service module forming the position data into a composite of position data, transmitting to at least one position session module, which then distributes the composite of position data to any of a variety of applications.

The exemplary system and method described have numerous advantages including the aggregation of position data from multiple sources, which eliminates the need of applications and devices having to communicate and negotiate position data directly from navigational position sources or devices. Still another advantage is the savings in processing power and memory by consolidating all position data. Yet another advantage is the ability to sort and deliver appropriate and useful position data to a device or application, while filtering out position data that is not relevant. This makes for more efficient utilization of computing resources and bandwidth.

FIG. 1 depicts an exemplary information appliance system 100. Shown in FIG. 1 are examples of components of an information appliance system 100, which comprises a plurality of servers 102 connected to a regional node 104 and a plurality of local nodes 106 connected to regional node 104. There can be any number of servers 102, regional nodes 104 and local nodes 106 within the information appliance system 100. The regional node 104 can be connected to a network such as the Internet 114 and any number of concierge services 112.

Without limitation, local node 106 can be a kiosk, cell site, local area network (LAN), telephone company, cable company, satellite, or any other information service, structure or entity that can transmit, receive and or communicate information. An information service can be any desired service including but not limited to telecommunications, broadband communications, entertainment, television, radio, recorded music, movies, computer-based games, Internet, and other types of public, private, personal, commercial, government, and military communications.

Local node 106 is connected to any number of user nodes 108 via wireline or wireless interface means. In the embodiment depicted in FIG. 1, user node 108 includes a user node communication device 109 (shown in FIG. 2) that is disposed to transmit and receive information using wireless communication means. User node 108 without limitation can include a car, truck, bus, aircraft, boat, cellular handset, personal digital assistant (PDA), hand-held portable device, computer, and the like. Without limitation, user node communication device 109 can be an integral part of user node 108, mounted in a vehicle or other mobile device, carried by the user of the information appliance system 100, and the like. User node 108 can include more than one user node communication device 109.

User node 108, via user node communication device 109 can also transmit and receive data from devices and services other than local node 106. For example, user node communication device 109 can transmit and receive data from a satellite 110, other user nodes 108, other user node communication devices 109, and the like.

The information appliance system 100 including the user node 108 and user node communication device 109 are capable of utilizing audio data in any number of encoding methods from any number of sources that include but are not limited to ADPCM, CD-DA, ITU G.711, G.722, G.723 & G.728, MPEG I,II & III, AC-3, AIFF, AIFC, AU, Pure Voice, Real Audio and WAV.

The information appliance system 100 including the user node 108 and user node communication device 109 are capable of utilizing video data in any number of encoding methods from any number of sources that include but are not limited to ITU H.261 & H.263, Motion JPEG, MPEG-1, MPEG-2 and MPEG-4, Cinepak, ClearVideo, Sony DV, Indeo, Real Video, Sorensen and VDOLive.

Additionally, the information appliance system 100 is capable of utilizing audio and video data in any number of formats from any number of sources that include but are not limited to USB, IEEE 1394-1995 and IEEE 802.x, and using protocols such as HTTP, TCP/IP, and UDP/IP.

Figure 2:
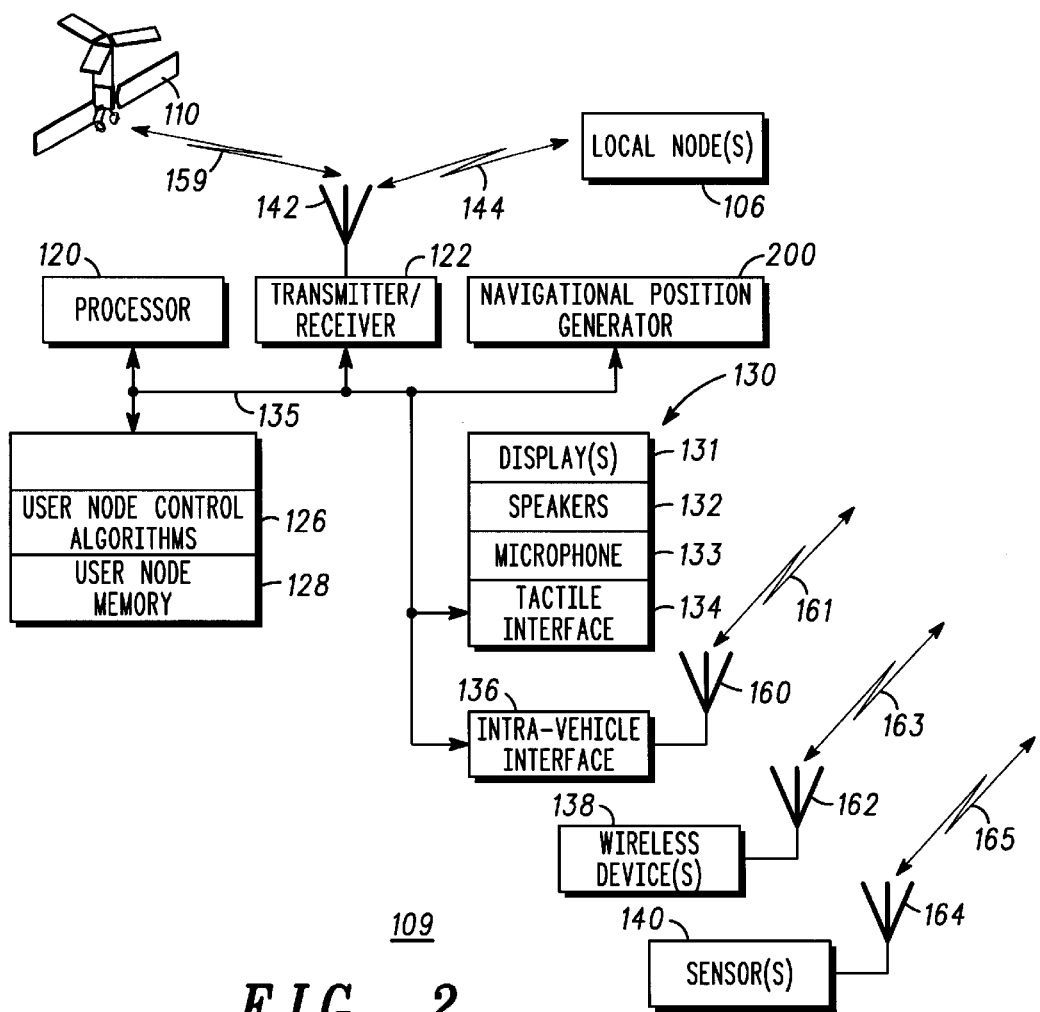
FIG. 2 depicts a user node communication device of an exemplary information appliance system.

FIG. 2 depicts a user node communication device 109 of an exemplary user node 108 of an exemplary information appliance system 100. User node communication device 109 can without limitation be located within user node 108, be an integral part of the user node, and the like. For example, user node communication device 109 can be mounted in a vehicle such as an automobile, boat or aircraft, carried with a user, located in a stationary location, and the like. As shown in FIG. 2, the user node communication device 109 comprises a processor 120 with associated user node control algorithms 126 and user node memory 128. User node memory 128 can include but is not limited to random access memory (RAM), read only memory (ROM) and other memory such as a hard disk, floppy disk, and or other appropriate type of memory. Processor 120 and user node control algorithms 126 can initiate and perform communication with other nodes shown in FIG. 1 in accordance with suitable programs stored in user node memory 128.

User node communication device 109 also comprises a user interface device 130 that can include without limitation a tactile interface 134, microphone 133, speakers 132, any number of displays 131, and the like.

User node communication device 109 also comprises a transmitter/receiver 122 for transmitting and receiving communications via a wireless signal 144 among the various nodes depicted in FIG. 1. Transmitter/receiver 122 also facilitates communication between other devices via wireless signal 159, for example, satellite 110, and the like. Communications are transmitted and received through one or more antenna 142, which can include any one or combination of a fixed, steerable, omni-directional, or phased array antenna. Steerable antenna can include, but is not limited to, an electronically steerable antenna, physically steerable antenna, and the like. User node communication device 109 can also include navigational position generator 200, which will be described in greater detail below.

User node communication device 109 can also comprise an intra-vehicle interface 136, which includes antenna 160. Intra-vehicle interface 136 is capable of short-range wireless communication, via wireless signal 161, with other wireless devices 138 and sensors 140, for example, cellular handsets, computers, pagers, PDA's, Games, printers, fax machines, TV, Bluetooth, vehicle status sensors, and the like. Wireless device 138 can have antenna 162 and communicate via wireless signal 163. Sensor 140 can have antenna 164 and communicate via wireless signal 165.

In an embodiment, the various components and systems in FIG. 2 can communicate with each other via a wireline link 135, for example, a power/data/control bus, and the like. In another embodiment, the various components and systems in FIG. 2 can communicate via a wireless link.

Figure 3:
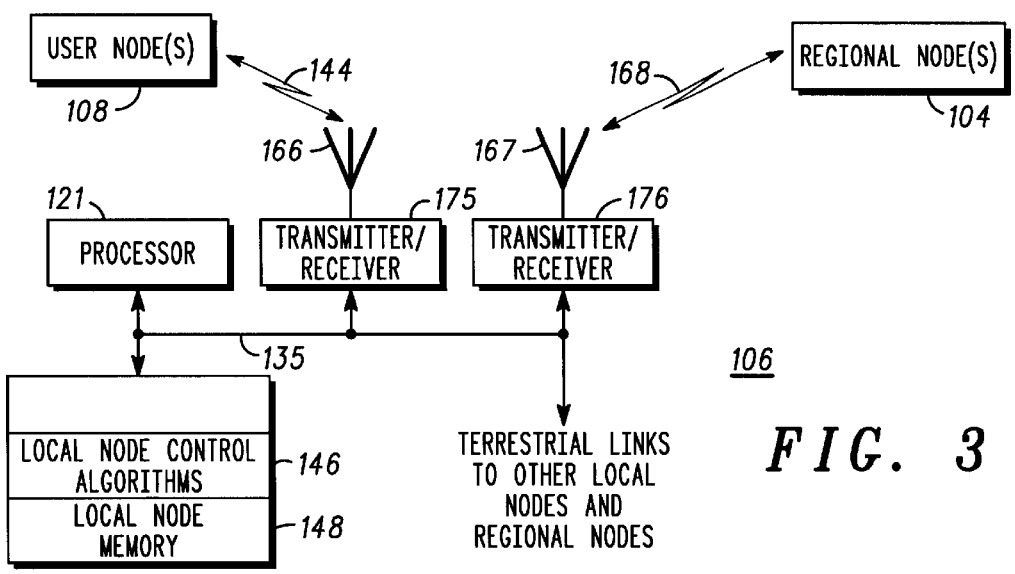
FIG. 3 depicts a local node of an exemplary information appliance system.

FIG. 3 depicts a local node 106 of an exemplary information appliance system 100. As shown in FIG. 3, the local node 106 comprises a processor 121 with associated local node control algorithms 146 and local node memory 148. Local node memory 148 can include but is not limited to random access memory (RAM), read only memory (ROM) and other memory such as a hard disk, floppy disk, and or other appropriate type of memory. Processor 121 and local node control algorithms 146 can initiate and perform communication with other nodes shown in FIG. 1 in accordance with suitable programs stored in local node memory 148.

Local node 106 also comprises any number of transmitters/receivers 175 for transmitting and receiving communications via wireless signal 144 from any number of user nodes 108. Communications are transmitted and received through antenna 166.

Local node 106 also comprises any number of transmitter/receivers 176 for transmitting and receiving communications via wireless signal 168 from any number of regional nodes 104. Communications are transmitted and received through antenna 167. As shown in FIG. 3, the various components and systems can also communicate via terrestrial links, wireline links, and the like, with other local nodes 106 and regional nodes 104.

In an embodiment, the various components and systems in FIG. 3 can communicate with each other via a wireline link 135, for example, a power/data/control bus, and the like. In another embodiment, the various components and systems in FIG. 3 can communicate via a wireless link.

Figure 4:
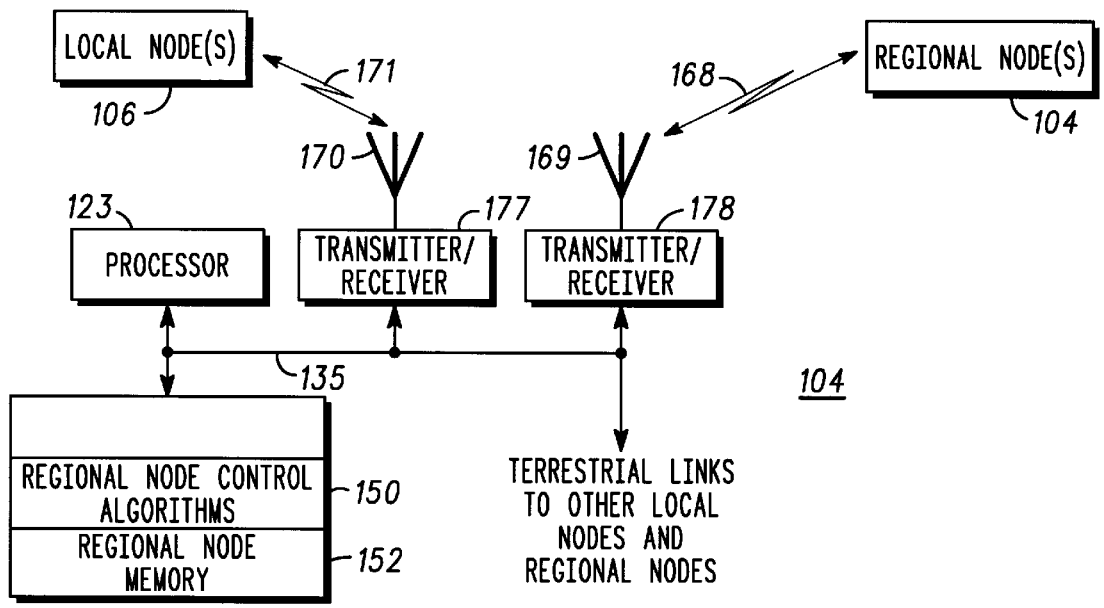
FIG. 4 depicts a regional node of an exemplary information appliance system.

FIG. 4 depicts a regional node 104 of an exemplary information appliance system 100. As shown in FIG. 4, the regional node 104 comprises a processor 123 with associated regional node control algorithms 150 and regional node memory 152. Regional node memory 152 can include but is not limited to random access memory (RAM), read only memory (ROM) and other memory such as a hard disk, floppy disk, and or other appropriate type of memory. Processor 123 and regional node control algorithms 150 can initiate and perform communication with other nodes shown in FIG. 1 in accordance with suitable programs stored in regional node memory 152.

Regional node 104 also comprises any number of transmitters/receivers 177 for transmitting and receiving communications via wireless signal 171 from any number of local nodes 106. Communications are transmitted and received through an antenna 170.

Regional node 104 also comprises any number of transmitters/receivers 178 for transmitting and receiving communications via wireless signal 168 from any number of regional nodes 104, servers 102, and the like. Communications are transmitted and received through antenna 169. As shown in FIG. 4, the various components and systems can also communicate via terrestrial links, wireline links, and the like, with other local nodes 106 and regional nodes 104.

In an embodiment, the various components and systems in FIG. 4 can communicate with each other via a wireline link 135, for example, a power/data/control bus, and the like. In another embodiment, the various components and systems in FIG. 4 can communicate via a wireless link.

Figure 5:
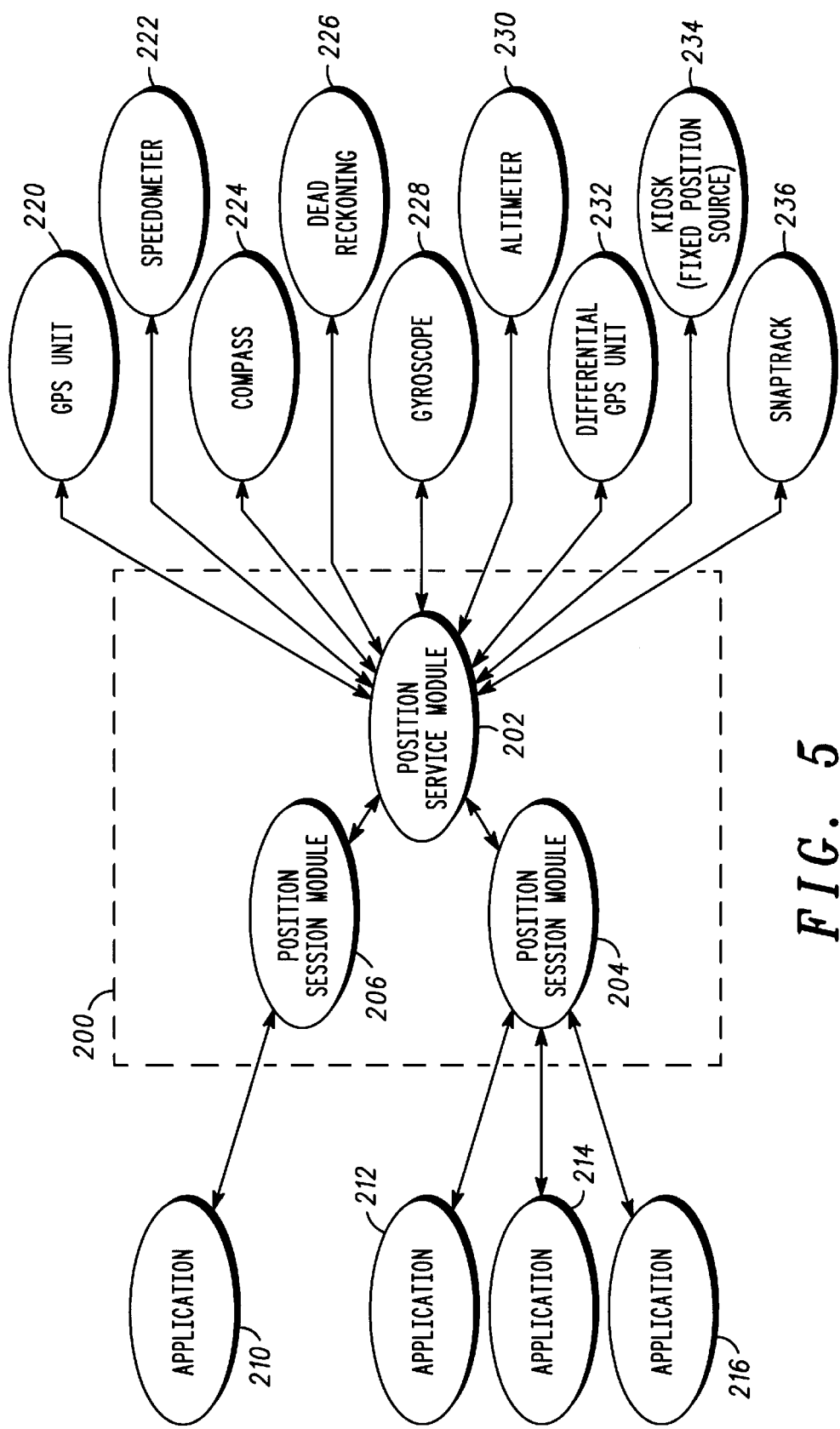
FIG. 5 depicts a block diagram of a navigational position generator.

FIG. 5 depicts a block diagram of navigational position generator 200. As shown in FIG. 5, navigational position generator 200 comprises position service module 202, which is connected to one or more position session modules 204, 206. Position service module 202 and position session modules 204, 206 can be software modules, hard-wired devices, and the like. Position generator 200 can be coupled to user node 108, user node communication device 109, and the like, and be utilized to define a position of user node 108.

Position service module 202 is also connected to a plurality of navigational position sources 208. As shown in FIG. 5, plurality of navigational position sources 208 can comprise one or more sources, devices, software modules, and the like, that provide position information or any component of position information. A portion of plurality of navigational position sources 208 can include sources or devices that are connected to, or are an integral part of user node 108. Also, a portion of plurality of navigational position sources 208 can include sources or devices that are located external to user node 108.

Examples of plurality of navigational position sources 208 that are connected to user node 108 are, without limitation, speedometer 222, compass 224, dead reckoning 226, gyroscope 228, altimeter 230, and the like. Plurality of navigational position sources 208 connected to user node 108 generate position data internally for position service module 202.

Examples of sources and devices that are located externally to user node 108 are, without limitation, global positioning system (UPS) unit 220, differential GPS 232, kiosk 234 (fixed position source), and SNAPTRACK™ 236 (Snaptrack Inc., 4040 Moorpark Ave., Suite 250, San Jose, Calif. 95117) which comprises terrestrial cellular triangulation, and the like. User node 108 in general, and position service module 202 in particular, are disposed to receive position data from plurality of navigational position sources 208 that are located externally to user node 108.

Other navigational position sources can include, without limitation, an airspeed device, Doppler device, inclinometer, accelerometer, any combination of optical transmitters, receivers, reflectors, optically readable tag, and the like. Fixed position sources could also include devices that are not actually fixed but provide a relative fixed position to the user node, for example, a ferryboat, subway car, and the like.

As shown in FIG. 5, position session modules 204, 206 can be connected to one or a more applications 210–216, which can include, without limitation, software applications, applications within user node 108 or user node communication device 109, applications external to user node 108 or user node communication device 109, non-software applications such as hard-wired devices, navigational applications, advertising applications, entertainment applications, commercial services (gasoline, movies, restaurants, and the like) safety applications, security applications, traffic applications, and the like. Without limitation, any device, software module, program, and the like, that requires position or navigation information can be included as an application. In operation, plurality of navigational position sources 208 are disposed to provide position data to at least one position service module 202. Position service module 202 is disposed to receive position data and aggregate position data from each of the plurality of navigational position sources 208 to form composite of position data 240. Composite of position data 240 is then transmitted to one or more requesting applications via position session module 204.

Position service module 202 also functions to identify erroneous position data from one or more plurality of navigational position sources 208 and eliminate such erroneous position data from composite of position data 240. Position service module 202 can also perform "sanity checking" on position data from plurality of navigational position sources 208, thereby resolving discrepancies between position data, and if necessary, discarding certain position data. For example, heading information from GPS unit 220 is significantly more accurate when the GPS unit is moving than when it is stationary. Therefore, if velocity of user node 108 drops to "0", then position service module 202 should defer to compass 224 heading position data, since heading position data from GPS unit 220 can be erroneous. Conversely, at higher speeds, heading position data from GPS unit 220 is significantly more accurate than heading position data from compass 224.

Plurality of navigational position sources can also generate their own error information which can include, but is not limited to degree of confidence, resolution, accuracy, and the like.

Figure 6:
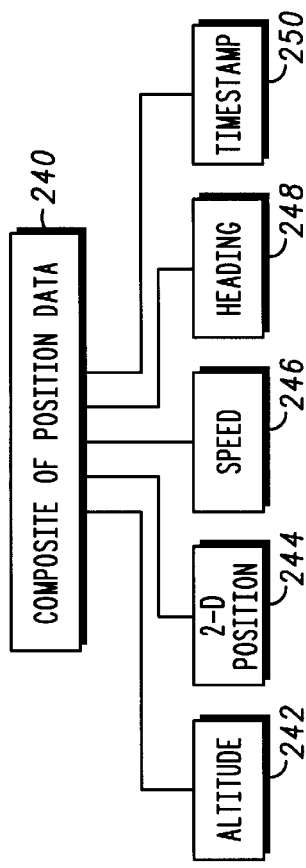
FIG. 6 depicts an exemplary composite of position data.

FIG. 6 depicts an exemplary composite of position data 240. As shown in FIG. 6, composite of position data 240 is comprised of various components of a position data, including without limitation, altitude 242, 2-dimensional (2-D) position 244, speed 246, heading 248, timestamp 250, and the like. Composite of position data 240 can, without limitation, contain one or more of the components of position data shown in FIG. 6, in addition to other components of position data, for example, aeronautical data such as airspeed, nautical data such as relative velocity to a water surface, and the like. Any components of position data that indicate a position, orientation, and the like, of user node 108 can be included in composite of position data 240. In an embodiment, composite of position data 240 can comprise position data from one or more of the plurality of navigational position sources 208.

Timestamp 250 indicates the time at which position data was taken. For example, GPS provides a time at which GPS position data is taken. Timestamp 250 allows position service module 202 to eliminate or compensate for latencies in end-to-end communication of position data from plurality of navigational position sources 208 to applications 210–216. Utilizing timestamp 250, position service module 202 can provide composite of position data 240 that reflects position data from each of the plurality of navigational position sources 208 taken at the same point in time.

Position session module 204, 206 is disposed to receive composite of position data 240 and transmit composite of position data 240 to any of the plurality of applications 210–216. In an embodiment, an application utilizes composite of position data 240 to define a position of user node 108. The position of user node 108 can be relative to a fixed point, for example a gas station, government building, point of interest, and the like. Also, the position of user node 108 can be coordinates, for example longitude, latitude, altitude, elevation, and the like.

Aggregating and consolidating position data from plurality of navigational position sources 208, has the advantage of eliminating the need of individual applications having to communicate directly with, and negotiate for position data. This has the further advantage of reducing processing power and memory required to provide applications 210–216 with position data. Still, a further advantage is a reduction in the time lag in providing accurate position data to applications 210–216 by eliminating the need of applications 210–216 to negotiate individually for position data.

Figure 7:
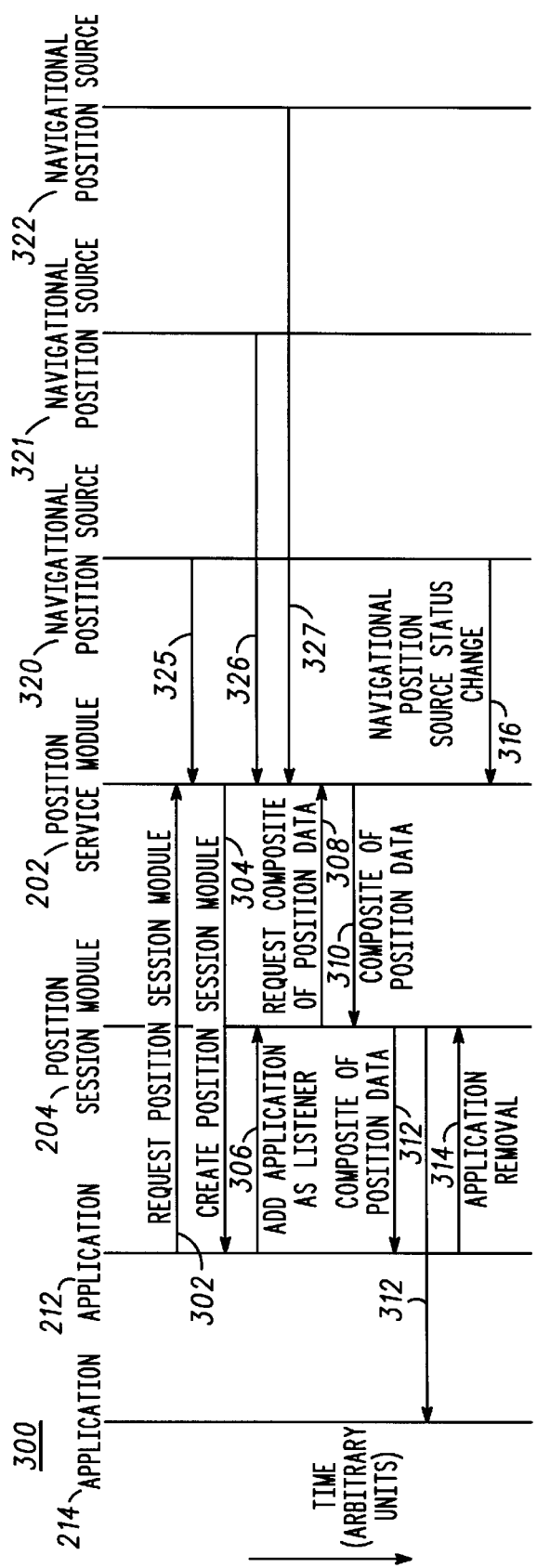
FIG. 7 depicts a ladder diagram for an embodiment of the invention.

FIG. 7 depicts a ladder diagram 300 for an embodiment of the invention. Signals between applications, position session module 204, position service module 202 and individual navigational position sources 320, 321, 322 are shown with time on the vertical axis.

As shown in FIG. 7, when an application 212 is brought on-line or made active, it registers with position service module 202 by sending request position session module signal 302 to position service module 202. In effect, application 212 is requesting composite of position data 240 from position service module 202. In request position session module signal 302, application 212 can include position data criteria (i.e. "special needs"), for example, application specified frequency of updating of position data, application specified accuracy of position data, type of position data, one or more components of composite of position data, resolution of composite of position data, position data from one or more particular navigational position sources 208, and the like.

If an application does not specify position data criteria, then the application will receive composite of position data 240 from one or more navigational position sources 208 with no guarantee that position data is coming from any particular navigational position source or device. In the absence of position data criteria, application 212 will receive the "best position" data available. "Best position" data can comprise, but is not limited to, the most accurate position data available, least expensive position data available, and the like.

Without limitation, application 212 can request composite of position data 240 with an application specified frequency be transmitted from position session module 204 to application 212. In another example, application 212 can request composite of position data 240 with an application specified accuracy be transmitted from position session module 204 to application 212. In still a farther example, application 212 can request data from one or more individual navigational position sources 320, 321, 322 be transmitted from position session module 204 to application 212.

In another embodiment, application 212 can request composite of position data 240 from position session module 204. In a further embodiment, application 212 can request composite of position data 240 from one or more of the plurality of navigational position sources 208.

Subsequently, position service module 202 will transmit signal 304 to inform application 212 that position session module 204 is being created. Position session module 204 can be configured to receive and transmit composite of position data 240 in accordance with the position data criteria specified by application 212. Application 212 is then added as a "listener" via signal 306 to position session module 204, which means that application 212 is configured to receive composite of position data 240 from position session module 204. Position session module 204 can distribute composite of position data 240 to one or more applications 210–216.

Since position session module 204 has at least one application 212 requesting composite of position data, position session module 204 will send signal 308 requesting composite of position data 240 to position service module 202. Signal 308 can be sent periodically or continuously depending on the position data criteria specified by the "listening" applications 212 subscribing to position session module 204. Position service module 202 will then transmit signal 310 comprising composite of position data 240 in accordance with signal 308 from position session module 204.

Subsequently, position session module 204 will transmit signal 312 comprising composite of position data 240 to application 212. In another embodiment, an additional application 214 can subscribe to position session module 204. Any number of applications can subscribe to position session module 204, thereby receiving composite of position data 240. In general, applications subscribing to position session module 204 specify substantially similar position data criteria. Signals 308, 310 and 312 occur repeatedly as required to supply application 212 composite of position data 240. In another embodiment, position service module 202 can maintain in existence one or more position session modules configured to receive and transmit composite of position data 240 of any particular position data criteria, for example, a frequently requested position data criteria, and the like, even when no applications are presently subscribed as "listeners."

Distributing composite of position data 240 from position session module 204 to applications 210–216 has numerous advantages including the ability to sort and deliver appropriate composite of position data 240 to a device or application, while filtering out position data that is not relevant to the application. In this manner, computing resources such as processing power and memory are utilized more efficiently by not retrieving and transmitting irrelevant position data to applications 210–216. Another advantage is that applications that need similar types position data can receive composite of position data from a single position session module 204, thereby conserving computing resources and filtering out position data unnecessary to those applications. Position session module 204 also provides a level of security. For example, if an application "misbehaves," position session module 204 deals with the errant application, taking the burden off position service module 202.

When application 212 goes dormant or becomes inactive it can send signal 314 instructing position session module 204 to remove application 212 as a "listener". This can happen, for example, when a user deactivates an application, or when user node 108 moves out of range of a kiosk or fixed position service providing a particular application and user node 108 is subsequently no longer able to utilize that particular application.

As shown in FIG. 7, signal 316 is sent from position service module 202 to position session module 204 to indicate navigational position source status changes. These can include, without limitation, discontinuing service from one or more individual navigational position sources 320, 321, 322, adding one or more individual navigational position sources 320, 321, 322, and the like. Utilizing signal 316, position session module 204 is notified of changes in position data available to position service module 202. For example, if GPS unit 220 becomes unavailable, any applications that specified position data come from GPS unit 220 will not be able to obtain GPS position data with its associated accuracy and frequency of updating.

Position data signals 325, 326, 327 represent position data from individual navigational position sources 320, 321, 322 respectively. When a user powers-up user node 108 and/or user node communication device 109, the available individual navigational position sources 320, 321, 322 can be identified and register with position service module 202 in a manner substantially similar to that described above for position session module 204 and applications 210–216.

In summary, an embodiment of the invention is for an information appliance system having a plurality of navigational position sources providing position data coupled with a position service module to form the position data into a composite of position data. A position session module is disposed to receive the composite of position data and transmit to one or more applications.

An exemplary method of an embodiment of the invention includes a position service module forming the position data into a composite of position data, transmitting to at least one position session module, which then distributes the composite of position data to any of a variety of applications.

The exemplary system and method described have numerous advantages including the aggregation of position data from multiple sources, which eliminates the need of applications and devices having to communicate and negotiate position data directly from navigational position sources or devices. Still another advantage is the savings in processing power and memory by consolidating all position data. Still yet another advantage is the ability to sort and deliver appropriate and useful position data to a device or application, while filtering out position data that is not relevant. This makes for more efficient utilization of computing resources and bandwidth.

While we have shown and described specific embodiments of the present invention, further modifications and improvements will occur to those skilled in the art. For example, navigational position generator can be used in any combination of vehicles, fixed position devices or personal hand-held devices to provide position information.

We desire it to be understood, therefore, that this invention is not limited to the particular forms shown and we intend in the appended claims to cover all modifications that do not depart from the spirit and scope of this invention.

What is claimed is:

1. An information appliance system comprising:
    a plurality of navigational position sources disposed to provide position data;
    a position service module, wherein the position service module is disposed to receive the position data, and wherein the position service module is disposed to form a composite of position data;
    a position session module disposed to receive the composite of position data from the position service module; and
    a plurality of applications disposed to receive the composite of position data from the position session module.

2. The information appliance system of claim 1, wherein the plurality of applications request the composite of position data from the position service module.

3. The information appliance system of claim 1, wherein the plurality of applications request the composite of position data from the position session module.

4. The information appliance system of claim 1, wherein the composite of position data comprises the position data from one or more of the plurality of navigational position sources.

5. The information appliance system of claim 1, wherein one or more of the plurality of applications requests the position data from one or more of the plurality of navigational position sources.

6. The information appliance system of claim 1, wherein one or more of the plurality of applications request the composite of position data continuously.

7. The information appliance system of claim 1, wherein one or more of the plurality of applications request the composite of position data at an application specified frequency.

8. The information appliance system of claim 1, further comprising a user node, wherein one or more of the plurality of applications utilizes the composite of position data to define a position of the user node.

9. The information appliance system of claim 1, wherein one or more of the plurality of applications requests the position session module, and wherein the composite of position data transmitted from the position session module to one or more of the plurality of applications comprises the composite of position data with an application specified accuracy.

10. The information appliance system of claim 1, wherein one or more of the plurality of applications requests the position session module, and wherein the composite of position data transmitted from the position session module to one or more of the plurality of applications comprises the position data from one or more of the plurality of navigational position sources.

11. The information appliance system of claim 1, wherein one or more of the plurality of applications requests the position session module, and wherein the composite of position data transmitted from the position session module to one or more of the plurality of applications is transmitted at an application specified frequency.

12. The information appliance system of claim 1, wherein the composite of position data is distributed to the plurality of applications through at least one position session module.

13. A method of distributing position data to a plurality of applications within an information appliance system comprising the steps of:
    providing a plurality of navigational position sources disposed to provide the position data;
    providing a position service module, wherein the position service module is disposed to receive the position data, and wherein the position service module is disposed to form a composite of position data;
    creating a position session module disposed to receive the composite of position data from the position service module; and
    distributing the composite of position data to the plurality of applications via the position session module.

14. The method of claim 13, further comprising requesting the composite of position data from the position service module.

15. The method of claim 13, further comprising requesting the composite of position data from the position session module.

16. The method of claim 13, further comprising providing a user node, wherein one or more of the plurality of applications utilizes the composite of position data to define a position of the user node.

17. The method of claim 13, further comprising requesting the position session module, wherein one or more of the plurality of applications requests the position session module, and wherein the composite of position data transmitted from the position session module to one or more of the plurality of applications comprises the composite of position data with an application specified accuracy.

18. The method of claim 13, further comprising requesting the position session module, wherein one or more of the plurality of applications requests the position session module, and wherein the composite of position data transmitted from the position session module to one or more of the plurality of applications comprises the position data from one or more of the plurality of navigational position sources.

19. The method of claim 13, further comprising requesting the position session module, wherein one or more of the plurality of applications requests the position session module, and wherein the composite of position data transmitted from the position session module to one or more of the plurality of applications is transmitted at an application specified frequency.

20. A method of distributing position data to a plurality of applications within an information appliance system comprising the steps of:
- providing a plurality of navigational position sources disposed to provide the position data;
- providing a position service module, wherein the position service module is disposed to receive the position data, and wherein the position service module is disposed to form a composite of position data;
- requesting the composite of position data, wherein one or more of the plurality of applications requests the composite of position data; and
- creating a position session module disposed to receive the composite of position data from the position service module and to transmit the composite of position data to one or more of the plurality of applications.

21. The method of claim 20, wherein the step of requesting the composite of position data comprises requesting the composite of position data from one or more of the plurality of navigational position sources.

22. The method of claim 20, wherein the step of requesting the composite of position data comprises requesting the composite of position data from the position session module.

23. The method of claim 20, wherein the step of requesting the composite of position data comprises requesting the composite of position data at an application specified frequency.

24. The method of claim 20, wherein the step of requesting the composite of position data comprises requesting the composite of position data continuously.

25. The method of claim 20, further comprising distributing the composite of position data to the plurality of applications through at least one position session module.

* * * * *